United States Patent
Tokuchi et al.

(10) Patent No.: US 8,969,474 B2
(45) Date of Patent: *Mar. 3, 2015

(54) THERMOPLASTIC ACRYLIC RESIN COMPOSITION

(75) Inventors: Kazuki Tokuchi, Kurashiki (JP); Wataru Tsuji, Kurashiki (JP); Nobuhiro Moriguchi, Kurashiki (JP); Noboru Higashida, Kurashiki (JP)

(73) Assignee: Kuraray Co., Ltd., Kurashiki-shi (JP)

(*) Notice: Subject to any disclaimer, the term of this patent is extended or adjusted under 35 U.S.C. 154(b) by 520 days.

This patent is subject to a terminal disclaimer.

(21) Appl. No.: 12/989,193

(22) PCT Filed: Apr. 21, 2009

(86) PCT No.: PCT/JP2009/001808
§ 371 (c)(1),
(2), (4) Date: Jan. 7, 2011

(87) PCT Pub. No.: WO2009/130883
PCT Pub. Date: Oct. 29, 2009

(65) Prior Publication Data
US 2011/0112247 A1  May 12, 2011

(30) Foreign Application Priority Data

Apr. 22, 2008 (JP) .................. 2008-111160
Apr. 22, 2008 (JP) .................. 2008-111161

(51) Int. Cl.
*C08G 63/48* (2006.01)
*C08G 63/91* (2006.01)
*C08L 29/04* (2006.01)
*C08L 33/12* (2006.01)
*C08F 220/14* (2006.01)
*C08L 29/14* (2006.01)

(52) U.S. Cl.
CPC ............ *C08L 33/12* (2013.01); *C08F 220/14* (2013.01); *C08L 29/14* (2013.01)
USPC ............ 525/57; 428/514; 428/515; 428/520; 524/503

(58) Field of Classification Search
CPC .................. C08L 29/13; C08L 33/12
USPC ............. 525/57; 428/514, 515, 520; 524/503
See application file for complete search history.

(56) References Cited

U.S. PATENT DOCUMENTS

| 2,326,543 A | 8/1943 | Maeht |
| 3,644,594 A * | 2/1972 | Mont et al. ............ 525/57 |
| 2004/0147675 A1 * | 7/2004 | Hofmann ............ 525/165 |

FOREIGN PATENT DOCUMENTS

| JP | 2001-207010 | 7/2001 |
| JP | 2004-91493 | 3/2004 |

OTHER PUBLICATIONS

Supplementary European Search Report issued Oct. 5, 2011, in Patent Application No. EP 09 73 4619.
International Search Report issued Jun. 23, 2009 in PCT/JP09/01808 filed on Apr. 21, 2009.

* cited by examiner

*Primary Examiner* — David W Wu
*Assistant Examiner* — Marie Reddick
(74) *Attorney, Agent, or Firm* — Oblon, McClelland, Maier & Neustadt, L.L.P.

(57) ABSTRACT

Provided is a thermoplastic acrylic resin composition comprising a methacrylic resin (A) and a polyvinyl acetal resin (B) obtained by acetalizing a polyvinyl alcohol resin with an aldehyde having 4 or more carbon atoms and an aldehyde having 3 or less carbon atoms in which the total amount of the vinyl alcohol units acetalized with the aldehyde having 4 or more carbon atoms and the aldehyde having 3 or less carbon atoms is 65 to 85 mol % of all repeating units, and the molar ratio of the vinyl alcohol unit acetalized with the aldehyde having 4 or more carbon atoms to the vinyl alcohol unit acetalized with the aldehyde having 3 or less carbon atoms is from 90/10 to 0/100. Furthermore, provided are an article molded from the thermoplastic acrylic resin composition and a method of producing the thermoplastic acrylic resin composition comprising the steps of mixing a methacrylic resin (A) and a polyvinyl acetal resin (B), increasing the resin temperature to 160° C. or more, and then decreasing the resin temperature to 120° C. or less.

16 Claims, No Drawings

THERMOPLASTIC ACRYLIC RESIN COMPOSITION

This application is a National Stage of PCT/JP09/001808 filed Apr. 21, 2009 and claims the benefit of JP 2008-111160 filed Apr. 22, 2008 and JP 2008-111161 filed Apr. 22, 2008.

TECHNICAL FIELD

The present invention relates to a thermoplastic acrylic resin composition capable of giving a transparent molded article having improved toughness and particularly relates to a thermoplastic acrylic resin composition capable of giving a molded article not being whitened when it is stretched, bent, or subjected to impact. Furthermore, the present invention relates to a thermoplastic acrylic resin composition capable of giving a transparent molded article having excellent balance between toughness and impact resistance or rigidity.

BACKGROUND ART

Polymethylmethacrylate-based thermoplastic polymers that are methacrylic resins have characteristics exhibiting excellent transparency that is high total light transmittance in the visible light region and surface hardness, and are therefore used in various fields. However, the methacrylic resins are insufficient in mechanical properties, in particular, in impact resistance and toughness for applying to some purposes and have been required to be improved.

In order to improve mechanical properties, usually, core-shell particles composed of a rubber layer and a methacrylic resin layer synthesized by emulsion polymerization are blended with a polymethylmethacrylate-based thermoplastic polymer (methacrylic resin). However, though a molded article made of a composition prepared by this method has an improved impact resistance, the toughness is not sufficiently improved. In addition, the blending of the rubber component causes decreases in surface hardness, rigidity, and heat resistance. Furthermore, when, for example, tension stress or bending stress is applied, whitening occurs in the area the stress is concentrated in some cases. Whitening may also occur when the molded article is applied with impact or left under high temperature and humidity conditions for a long time. The whitening leads to loss of the transparency and a tendency of deterioration of the design characteristics and the quality of the molded article.

As another method for improving the toughness of a methacrylic resin, proposed is a method where methyl methacrylate is copolymerized with another monomer that reduces the glass transition temperature. However, this method has problems in that the rigidity and the heat resistance are considerably decreased.

A methacrylic resin composition prepared by blending a methacrylic resin with another polymer is also proposed. The polymer blended with the methacrylic resin is, for example, a styrene-acrylonitrile copolymer having a specific composition, polyvinyl chloride, polyvinylidene fluoride or the like. However, the toughness cannot be sufficiently improved by blending these polymers.

Blending of polyethylene oxide is also proposed. The polyethylene oxide is excellent in compatibility with polymethylmethacrylate, and, therefore, improvement of toughness can be expected. However, since the glass transition temperature is low, decreases in the rigidity and the heat resistance of the composition cannot be avoided.

Polycarbonate is a polymer that can be expected to improve balance among toughness, heat resistance and transparency. It is reported that a transparent composition composed of bisphenol A polycarbonate and polymethylmethacrylate is obtained by, for example, dissolving polymethylmethacrylate and polycarbonate in tetrahydrofuran, adding the solution to heptane for precipitation, and heating the precipitate at a temperature higher than the glass transition temperatures of the polymethylmethacrylate and the polycarbonate. However, molded articles made of this composition have low surface hardness. Furthermore, since a solvent is used for preparing the composition, great deal of energy is necessary for removing the solvent, resulting in low productivity. Melt-kneading of polycarbonate and polymethylmethacrylate is also reported. However, articles molded from the melt-kneaded composition are opaque and pearlescent because of phase separation of the polycarbonate and the polymethylmethacrylate (Non-Patent Document 1).

Polyvinyl butyral is a candidate polymer potentially miscible with polymethylmethacrylate.

Non-Patent Document 2 discloses that since a methyl methacrylate resin and polyvinyl butyral are weakly miscible, products obtained by mixing them usually have a two-phase structure as a result of phase separation, however, that by using a methyl methacrylate resin having a low molecular weight in the mixing, both are possibly miscible to form a single phase. FIG. 5 in Non-Patent Document 2 shows an optical microscope image of a film obtained by dissolving a blend of 50 parts by mass of methyl methacrylate resin and 50 parts by mass of polyvinyl butyral containing various amounts of vinyl alcohol units in a solvent, and carrying out cast molding. This film has a phase separation structure in which the methyl methacrylate resin composes various sizes of dispersed phases.

Non-Patent Document 3 discloses blends obtained by melt-kneading polyvinyl butyral and polymethylmethacrylate having a weight-average molecular weight of 120,000 in various proportions. According to Non-Patent Document 3, blends containing larger amounts of polyvinyl butyral show greater elongation at breaking in a tension test, yield behavior, and improved toughness. However, the blends containing larger amounts of polyvinyl butyral described in Non-Patent Document 3 had insufficient mechanical properties. In contrast, in blends containing polyvinyl butyral in the amount of less than 50 mass %, toughness was hardly improved, and mechanical properties were insufficient.

Furthermore, Patent Document 1 discloses a resin composition composed of a plasticized polyvinyl acetal resin and a block copolymer containing a methacrylic copolymer block and an acrylic polymer block. According to Patent Document 1, this resin composition is used for bonding two glass plates and is suppressed in a whitening phenomenon due to contact with air. However, the resin composition has very low surface hardness because of a large amount of plasticizer contained therein, and the mechanical properties are also insufficient.

CITATION LIST

Patent Literature

Patent Document 1: Japanese Patent Laid-Open No. 2003-40653

Non Patent Literature

Non-Patent Document 1: Journal of Polymer Science PART B, Polymer Physics, Vol. 25, 1459 (1987)
Non-Patent Document 2: Macromolecules, Vol. 34, 4277 (2001)

Non-Patent Document 3: J. Ind. Eng. Chem., Vol. 8, No. 6, 530 (2002)

SUMMARY OF THE INVENTION

Problems to be Resolved by the Invention

An object of the present invention is to provide a thermoplastic acrylic resin composition having improved toughness while maintaining characteristics, such as transparency, high surface hardness, high rigidity, weather resistance, and heat resistance, which are inherent in methacrylic resins and, particularly, to provide a thermoplastic acrylic resin composition not being whitened when stretched, bent, or subjected to impact.

Another object of the present invention is to provide a thermoplastic acrylic resin composition to give a transparent molded article having excellent balance between toughness and impact resistance or rigidity.

Means of Solving the Problems

The present inventors have conducted intensive studies to achieve the objects mentioned above and, as a result, have found that a thermoplastic acrylic resin composition comprising a methacrylic resin and a specific polyvinyl acetal resin has satisfactory toughness and impact resistance while maintaining characteristics, such as transparency, high surface hardness, high rigidity, weather resistance, and heat resistance, which are inherent in the methacrylic resin. In addition, it has been found that articles molded from the thermoplastic acrylic resin composition are not whitened even when stretched, bent, subjected to impact. The present invention has been accomplished by conducting further investigation based on these findings.

That is, the present invention provides a thermoplastic acrylic resin composition comprising a methacrylic resin (A) and a polyvinyl acetal resin (B), wherein the polyvinyl acetal resin (B) is produced by acetalizing a polyvinyl alcohol resin with an aldehyde having 4 or more carbon atoms and an aldehyde having 3 or less carbon atoms; in which the total amount of vinyl alcohol units acetalized with the aldehyde having 4 or more carbon atoms and the aldehyde having 3 or less carbon atoms is 65 to 85 mol % of all repeating units; and the molar ratio of the vinyl alcohol unit acetalized with the aldehyde having 4 or more carbon atoms to the vinyl alcohol unit acetalized with the aldehyde having 3 or less carbon atoms is from 90/10 to 0/100.

Advantageous Effects of the Invention

The thermoplastic acrylic resin composition of the present invention has satisfactory toughness and impact resistance while maintaining characteristics, such as transparency, high surface hardness, high rigidity, weather resistance, and heat resistance, which are inherent in the methacrylic resin.

Articles molded from this thermoplastic acrylic resin composition are not whitened even when stretched, bent, subjected to impact. In addition, the molded articles of the present invention have satisfactory toughness and impact resistance while maintaining characteristics, such as transparency, high surface hardness, high rigidity, weather resistance, and heat resistance, which are inherent in the methacrylic resin.

The thermoplastic acrylic resin composition and the molded article of the present invention having such advantageous characteristics can be used in a wider range of purposes.

DESCRIPTION OF EMBODIMENTS

The present invention will be described in detail below.

The thermoplastic acrylic resin composition of the present invention comprises a methacrylic resin (A) and a polyvinyl acetal resin (B).

The methacrylic resin (A) used in the present invention is prepared by polymerizing a monomer mixture comprising an alkyl methacrylate.

Examples of the alkyl methacrylate include methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, octyl methacrylate, 2-ethylhexyl methacrylate, dodecyl methacrylate, myristyl methacrylate, palmityl methacrylate, stearyl methacrylate, behenyl methacrylate, cyclohexyl methacrylate, and the like. These alkyl methacrylates can be used alone or in combination of two or more. Among them, alkyl methacrylates where the alkyl group has 1 to 4 carbon atoms are preferred, and methyl methacrylate is particularly preferred.

The monomer mixture may comprise an alkyl acrylate, in addition to the alkyl methacrylate.

Examples of the alkyl acrylate include methyl acrylate, ethyl acrylate, propyl acrylate, isopropyl acrylate, n-butyl acrylate, sec-butyl acrylate, tert-butyl acrylate, pentyl acrylate, hexyl acrylate, octyl acrylate, 2-ethylhexyl acrylate, dodecyl acrylate, myristyl acrylate, palmityl acrylate, stearyl acrylate, behenyl acrylate, cyclohexyl acrylate, and the like. Among them, alkyl acrylates where the alkyl group has 1 to 8 carbon atoms are preferred. These alkyl acrylates can be used alone or in combination of two or more.

The monomer mixture may further comprise another ethylenical unsaturated monomer copolymerizable with the alkyl methacrylate and the alkyl acrylate.

Examples of the ethylenical unsaturated monomer copolymerizable with the alkyl methacrylate and the alkyl acrylate include diene compounds such as 1,3-butadiene, isoprene and the like; vinyl aromatic compounds such as styrene, α-methylstyrene, vinyltoluene, 2,4-dimethylstyrene, halogennuclear substituted styrenes, 1-vinylnaphthalene, 4-methylstyrene, 4-propylstyrene, 4-cyclohexylstyrene, 4-dodecylstyrene, 2-ethyl-4-benzylstyrene, 4-(phenylbutyl)styrene and the like; ethylenical unsaturated nitriles such as acrylonitrile, methacrylonitrile and the like; and acrylic acid, methacrylic acid, acrylamide, methacrylamide, maleic anhydride, maleimide, monomethyl maleate, dimethyl maleate, phenyl methacrylate, phenyl acrylate and the like. These ethylenical unsaturated monomers can be used alone or in combination of two or more.

From the viewpoint of weather resistance, the content of the alkyl methacrylate unit in the methacrylic resin (A) used in the present invention is preferably 50 to 100 mass % and more preferably 80 to 99.9 mass %.

Furthermore, from the viewpoint of heat resistance, the methacrylic resin (A) preferably contains the alkyl acrylate unit in the range of 0.1 to 20 mass %.

The methacrylic resin (A) used in the present invention has a weight-average molecular weight (hereinafter, referred to as Mw) of preferably 40000 or more, more preferably 40000 to 10000000, and most preferably 80000 to 1000000, from the viewpoints of strength properties and melting properties.

The molecular chain of the methacrylic resin (A) used in the present invention may be linear or branched or may have a cyclic structure.

The methacrylic resin (A) used in the present invention may be produced by any method without particular limitation, as long as ethylenical unsaturated compounds can be polymerized, but the methacrylic resin (A) is preferably produced by radical polymerization. As the polymerization method, mentioned are bulk polymerization, suspension polymerization, solution polymerization, emulsion polymerization, and the like.

Examples of the radical polymerization initiator used in the polymerization include azo compounds such as azobisisobutyronitrile, azobis(y-dimethyl valeronitrile), and the like; and peroxides such as benzoyl peroxide, cumyl peroxide, [[oxy]] peroxy neodecanoate, diisopropyl peroxydicarbonate, t-butyl cumyl peroxide, cumene hydroperoxide, t-butyl hydroperoxide, cyclohexanone peroxide, methyl ethyl ketone peroxide, dicumyl peroxide, lauroyl peroxide, and the like. The polymerization initiator is usually used in an amount of 0.05 to 0.5 part by mass based on 100 parts by mass of the total amount of the monomer. The polymerization is usually performed at 50 to 140° C. for 2 to 20 hours.

In order to control the molecular weight of the methacrylic resin (A), a chain transfer agent can be used. Examples of the chain transfer agent include methyl mercaptan, ethyl mercaptan, isopropyl mercaptan, n-butyl mercaptan, t-butyl mercaptan, n-hexyl mercaptan, n-octyl mercaptan, n-dodecyl mercaptan, ethyl thioglycolate, mercaptoethanol, thio-β-naphthol, thiophenol, and the like. The chain transfer agent is usually used in an amount of 0.005 to 0.5 mass % relative to the total amount of the monomer.

The polyvinyl acetal resin (B) used in the present invention is produced by acetalizing a polyvinyl alcohol resin with an aldehyde having 4 or more carbon atoms and an aldehyde having 3 or less carbon atoms.

The polyvinyl alcohol resin used for producing the polyvinyl acetal resin (B) has a viscosity-average degree of polymerization of usually 200 to 4000, preferably 300 to 3000, and more preferably 500 to 2500. If the viscosity-average degree of polymerization of the polyvinyl alcohol resin is smaller than 200, the mechanical properties of the resulting polyvinyl acetal resin becomes insufficient, and the mechanical properties of the thermoplastic acrylic resin composition of the present invention, in particular, the toughness and impact resistance tend to be insufficient. On the other hand, a polyvinyl alcohol resin having a viscosity-average degree of polymerization larger than 4000 makes the viscosity of the produced thermoplastic acrylic resin composition of the present invention high and thereby the production of the thermoplastic acrylic resin composition of the present invention tend to be difficult. This tendency is significant particularly when the thermoplastic acrylic resin composition of the present invention is produced by melt-kneading.

The polyvinyl alcohol resin may be produced by any method without particular limitation and may be produced by, for example, saponifying polyvinyl acetate or the like with an alkali, acid, or ammonia water. The polyvinyl alcohol resin may be a completely saponified resin or a partially saponified resin (that is, partially saponified polyvinyl alcohol resin). The degree of saponification is preferably 80 mol or more and more preferably 97 mol % or more. When the thermoplastic acrylic resin composition of the present invention is produced by melt-kneading, a polyvinyl alcohol resin having a degree of saponification of 99.5 mol % or more is particularly preferably employed.

Furthermore, as the polyvinyl alcohol resin, a copolymer of a vinyl alcohol and a monomer copolymerizable with the vinyl alcohol, such as an ethylene-vinyl alcohol copolymer resin or a partially saponified ethylene-vinyl alcohol copolymer resin can be used. In addition, a modified polyvinyl alcohol resin where, for example, carboxylic acid is partially

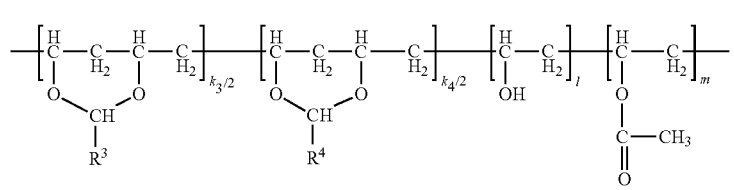

[Formula 1]

The polyvinyl acetal resin (B) is, for example, a resin represented by Formula 1.

In Formula 1, $R^3$ denotes an alkyl residue or a hydrogen atom of the aldehyde having 3 or less carbon atoms used in the acetalization reaction; $R^4$ denotes an alkyl residue of the aldehyde having 4 or more carbon atoms used in the acetalization reaction (note that each of the numbers of the carbon atoms of alkyl residues $R^3$ and $R^4$ is an integer i obtained by subtracting 1 from the number of the carbon atoms of the aldehyde used in the acetalization reaction and that when i is zero, $R^3$ denotes a hydrogen atom); $k_3$ denotes the molar ratio of the vinyl alcohol unit acetalized with the aldehyde having 3 or less carbon atoms; $k_4$ denotes the molar ratio of the vinyl alcohol unit acetalized with the aldehyde having 4 or more carbon atoms; l denotes the molar ratio of the vinyl alcohol unit not acetalized; and m denotes a molar ratio of the vinyl acetate unit. Note that m may be zero. Arrangement of the units is not particularly limited by the arrangement sequence shown in Formula 1, and the units may be arranged randomly, blockish-ly, or tapered-ly.

introduced can be used. These polyvinyl alcohol resins can be used alone or in combination of two or more.

Examples of the aldehyde having 3 or less carbon atoms used for producing the polyvinyl acetal resin (B) include formaldehyde (including paraformaldehyde), acetaldehyde (including paraacetaldehyde), propionaldehyde, and the like. These aldehydes having 3 or less carbon atoms can be used alone or in combination of two or more. Among these aldehydes having 3 or less carbon atoms, from the viewpoint of easiness in production, an acetaldehyde or formaldehyde (including paraformaldehyde)-based aldehydes are preferred, and acetaldehyde is particularly preferred.

Examples of the aldehyde having 4 or more carbon atoms used for producing the polyvinyl acetal resin (B) include butyl aldehyde, isobutyl aldehyde, n-octyl aldehyde, amyl aldehyde, hexyl aldehyde, heptyl aldehyde, 2-ethylhexyl aldehyde, cyclohexyl aldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like. These aldehydes having 4 or more carbon atoms can be used alone or in combination of two or more. Among these aldehydes having 4 or more carbon atoms, from the viewpoint of easiness in production, butyl aldehyde-based aldehydes are preferred, and butyl aldehyde is particularly preferred.

In the polyvinyl acetal resin (B) used in the present invention, the total amount of the vinyl alcohol units acetalized with the aldehyde having 4 or more carbon atoms and the aldehyde having 3 or less carbon atoms is from 65 to 85 mol %, preferably from 70 to 85 mol %, and more preferably from 80 to 85 mol % of all repeating units, from the viewpoint of mechanical properties. If the total amount of the acetalized vinyl alcohol units is smaller than 65 mol % of all repeating units, the mechanical properties of the thermoplastic acrylic resin composition of the present invention, in particular, toughness and impact resistance, become insufficient. On the other hand, the production of a polyvinyl acetal resin having 85 mol % or more of the acetalized vinyl alcohol units needs a very long period of time, which is economically disadvantageous. The "mol %" of the repeating units is calculated by defining the unit composed of two carbon atoms of the main chain in the polyvinyl alcohol resin being a raw material for producing the polyvinyl acetal resin (for example, a vinyl alcohol unit, a vinyl acetate unit, an ethylene unit and so on) as one repeating unit. For example, in the polyvinyl acetal resin shown in Formula 1, the mol % ($k_{(AA)}$) of the vinyl alcohol unit acetalized with the aldehyde having 3 or less carbon atoms with respect to all repeating units ($k_3+k_4+l+m$) is obtained by an expression: $k_3/(k_3+k_4+l+m)\times100$; the mol % ($k_{(BA)}$) of the vinyl alcohol unit acetalized with the aldehyde having 4 or more carbon atoms is obtained by an expression: $k_4/(k_3+k_4+l+m)\times100$; the mol % ($k_{(VA)}$) of the vinyl alcohol unit not acetalized is obtained by an expression: $l/(k_3+k_4+l+m)\times100$; and the mol % ($k_{(AV)}$) of the vinyl acetate unit is obtained by an expression: $m/(k_3+k_4+l+m)\times100$.

In the polyvinyl acetal resin (B) used in the present invention, from the viewpoint of mechanical properties, the molar ratio of the vinyl alcohol unit acetalized with the aldehyde having 4 or more carbon atoms to the vinyl alcohol unit acetalized with the aldehyde having 3 or less carbon atoms is from 90/10 to 0/100, preferably from 80/20 to 0/100, more preferably 50/50 to 0/100, and most preferably 40/60 to 1/99.

Using such a polyvinyl acetal resin can give a thermoplastic acrylic resin composition having satisfactory toughness and impact resistance while maintaining characteristics, such as transparency, high surface hardness, high rigidity, weather resistance, and heat resistance, which are inherent in the methacrylic resin.

The toughness and the impact resistance are improved, in the polyvinyl acetal resin (B) used in the present invention, when the total amount of the vinyl alcohol unit acetalized with the aldehyde having 4 or more carbon atoms and the aldehyde having 3 or less carbon atoms is from 70 to 85 mol % or when the molar ratio of the vinyl alcohol unit acetalized with the aldehyde having 4 or more carbon atoms to the vinyl alcohol unit acetalized with the aldehyde having 3 or less carbon atoms is from 40/60 to 0/100.

The toughness and the impact resistance are further improved when the total amount of the vinyl alcohol unit acetalized with the aldehyde having 4 or more carbon atoms and the aldehyde having 3 or less carbon atoms is from 70 to 85 mol % and the molar ratio of the vinyl alcohol unit acetalized with the aldehyde having 4 or more carbon atoms to the vinyl alcohol unit acetalized with the aldehyde having 3 or less carbon atoms is from 40/60 to 0/100.

The polyvinyl alcohol resin may be acetalized with the aldehydes by any known method. For example, the acetalization can be performed by a water solvent method where a polyvinyl alcohol resin aqueous solution and an aldehyde are subjected to acetalization reaction in the presence of an acid catalyst to precipitate resin particles; or a solvent method where a polyvinyl alcohol resin is dispersed in an organic solvent and acetalized with an aldehyde in the presence of an acid catalyst, and this reaction solution is subjected to precipitation with a poor solvent against the polyvinyl acetal resin, such as water. In these, the water solvent method is preferred.

The aldehydes used for acetalization may be fed at once or may be each fed separately. The randomness of the vinyl acetal units in a polyvinyl acetal resin can be varied by changing the addition order of the aldehydes and the addition order of the acid catalyst.

The acid catalyst used for the acetalization is not particularly limited, and examples thereof include organic acids such as acetic acid, p-toluenesulfonic acid and the like; inorganic acids such as nitric acid, sulfuric acid, hydrochloric acid and the like; gases becoming acidic in their aqueous solutions, such as carbon dioxide; and solid acid catalysts such as cation exchangers, metal oxides and the like.

The total degree of acetalization of the polyvinyl acetal resin may be determined in accordance with the method described in JIS K 6728 (1977) by determining the mass ratio ($l_0$) of the vinyl alcohol unit not acetalized and the ratio ($m_0$) of the vinyl acetate unit by titration; determining the mass ratio ($k_0$) of the acetalized vinyl alcohol unit by a calculation expression: $k_0=1-l_0-m_0$; calculating the molar ratio (l) of the vinyl alcohol unit not acetalized and the molar ratio (m) of the vinyl acetate unit; calculating the molar ratio (k) of the acetalized vinyl alcohol unit by a calculation expression, $k=1-l-m$; and determining the total degree of acetalization by an expression: total acetalization degree [mol %]=$k/\{k+l+m\}\times100$, or may be determined by dissolving the polyvinyl acetal resin in deuterated dimethyl sulfoxide; and measuring the solution by $^1$H-MMR or $^{13}$C-NMR.

By employing the method of calculating based on the $^1$H-MMR or $^{13}$C-NMR measurement, the molar ratio of the acetalized vinyl alcohol unit for each of the aldehydes (1), (2), . . . , and (n) can be calculated. For example, the degree of acetalization (mol %) for the aldehyde (n) can be calculated by an expression: $k_{(n)}/\{k_{(1)}+k_{(2)}+\ldots+k_{(n)}+l+m\}\times100$. The $k_{(1)}$, $k_{(2)}$, . . . , and $k_{(n)}$ denote molar ratios of the acetalized vinyl alcohol units for the respective aldehydes (1), (2), . . . , and (n).

The molar ratio of a vinyl alcohol unit acetalized with butyl aldehyde is particularly called a degree of butyralization; the molar ratio of a vinyl alcohol unit acetalized with acetaldehyde is particularly called a degree of acetacetalization; and the molar ratio of a vinyl alcohol unit acetalized with formaldehyde is called a degree of formalization.

For example, in a polyvinyl acetal resin obtained by acetalization of a polyvinyl alcohol resin with butyl aldehyde, acetaldehyde, and formaldehyde, when $k_{(BA)}$ denotes the molar ratio of the vinyl alcohol unit acetalized with butyl aldehyde, $k_{(AA)}$ denotes the molar ratio of the vinyl alcohol unit acetalized with acetaldehyde, $k_{(FA)}$ denotes the molar ratio of the vinyl alcohol unit acetalized with formaldehyde, l denotes the molar ratio of the vinyl alcohol unit not acetalized, and m denotes the molar ratio of the vinyl acetate unit, the degree of butyralization is determined by an expression: $k_{(BA)}/\{k_{(BA)}+k_{(AA)}+k_{(FA)}+l+m\}\times100$, the degree of acetacetalization is determined by an expression: $k_{(AA)}/\{k_{(BA)}+$ $k_{(AA)}+k_{(FA)}+l+m\} \times 100$, and the degree of formalization is determined by an expression: $k_{(FA)}/\{k_{(BA)}+k_{(AA)}+k_{(FA)}+l+m\} \times 100$.

The slurry generated in the water solvent method or the solvent method is usually acidic due to the acid catalyst. The acid catalyst is removed by, for example, repeatedly washing the slurry with water to adjust the pH to usually 5 to 9, preferably 6 to 9, and more preferably 6 to 8; adding a neutralizing agent to the slurry to adjust the pH to usually 5 to 9, preferably 6 to 9, and more preferably 6 to 8; or adding an alkylene oxide.

Examples of the compound used for removing the acid catalyst include alkali metal compounds such as sodium hydroxide, potassium hydroxide, sodium acetate, sodium carbonate, sodium hydrogen carbonate, potassium carbonate and the like; or ammonia and aqueous ammonia. Examples of the alkylene oxide include ethylene oxide, propylene oxide; and glycidyl ethers such as ethylene glycol diglycidyl ether.

Then, the salts generated by the neutralization, reaction residues of the aldehydes, and so on are removed. They may be removed by any method without particular limitation and are usually removed by repeating dehydration and washing with water, for example.

The polyvinyl acetal resin in a hydrous state after the removal of the residues and so on is dried if need be and processed into a powder, granule, or pellet form if need be to be provided as a molding material. When the polyvinyl acetal resin is processed into a powder, granule, or pellet form, the reaction residues of the aldehydes, water, etc. are preferably decreased by degassing under reduced pressure.

The primary dispersion peak temperature ($T\alpha_A$) of the methacrylic resin (A) and the primary dispersion peak temperature ($T\alpha_B$) of the polyvinyl acetal resin (B) used in the present invention preferably satisfy a relationship of $90°$ $C. \leq T\alpha_B \leq T\alpha_A$ or $90°$ $C. \leq T\alpha_A \leq T\alpha_B$, more preferably $95°$ $C. \leq T\alpha_B \leq T\alpha_A$ or $95°$ $C. \leq T\alpha_A \leq T\alpha_B$, and most preferably $110°$ $C. \leq T\alpha_B \leq T\alpha_A$ or $110°$ $C. \leq T\alpha_A \leq T\alpha_B$. If the $T\alpha_A$ or the $T\alpha_B$ is lower than $90°$ C., the heat resistance of the thermoplastic acrylic resin composition of the present invention tends to be decreased.

When the methacrylic resin (A) is a combination of two or more methacrylic resins, the primary dispersion peak temperature of any one of the resins is used as the $T\alpha_A$, and when the polyvinyl acetal resin (B) is a combination of two or more polyvinyl acetal resins, the primary dispersion peak temperature of any one of the resins is used as the $T\alpha_B$.

The primary dispersion peak temperature ($T\alpha$) can be determined by a dynamic viscoelastic measurement. For example, the primary dispersion peak temperature ($T\alpha$) can be determined from a loss tangent ($\tan \delta$) of a test piece having a length of 20 mm, a width of 3 mm, and a thickness of 120 to 200 μm as measured using DVE Rheospectoler DVE-V4, produced by Rheology Co., Ltd., under conditions of a sine wave vibration of 10 Hz and a rate of temperature increase of $3°$ C./min. The primary dispersion peak temperature ($T\alpha$) is a temperature at the peak of the primary dispersion of a loss tangent ($\tan \delta$) and is sometimes called a glass transition temperature (Tg) in a broad sense.

In the thermoplastic acrylic resin composition of the present invention, the mass ratio of the methacrylic resin (A) to the polyvinyl acetal resin (B), (A)/(B), is usually from 99/1 to 1/99, preferably from 99/1 to 51/49, more preferably from 95/5 to 60/40, and most preferably 90/10 to 60/40. If the ratio of the polyvinyl acetal resin (B) is less than 1 mass %, effects of improving the mechanical properties, such as toughness and impact resistance, of the thermoplastic acrylic resin composition of the present invention tend to be reduced. On the other hand, if the ratio of the polyvinyl acetal resin (B) is higher than 99 mass %, the surface hardness (and rigidity) of the thermoplastic acrylic resin composition of the present invention tends to be insufficient.

The primary dispersion peak temperature of the thermoplastic acrylic resin composition of the present invention includes a primary dispersion peak temperature ($T\alpha_{AP}$) derived from the methacrylic resin (A) in the thermoplastic acrylic resin composition and a primary dispersion peak temperature ($T\alpha_{BP}$) derived from the polyvinyl acetal resin (B) in the thermoplastic acrylic resin composition.

In the thermoplastic acrylic resin composition of the present invention, the primary dispersion peak temperature $T\alpha_{AP}$ derived from the methacrylic resin (A) in the thermoplastic acrylic resin composition, the primary dispersion peak temperature ($T\alpha_A$) of the methacrylic resin (A), and the primary dispersion peak temperature ($T\alpha_B$) of the polyvinyl acetal resin (B) preferably satisfy a relationship of $T\alpha_{AP}<T\alpha_A$ or $T\alpha_{AP}<T\alpha_B$.

Furthermore, in the thermoplastic acrylic resin composition of the present invention, the primary dispersion peak temperature $T\alpha_{AP}$ derived from the methacrylic resin (A) in the thermoplastic acrylic resin composition is preferably a level between the primary dispersion peak temperature ($T\alpha_A$) of the methacrylic resin (A) and the primary dispersion peak temperature ($T\alpha_B$) of the polyvinyl acetal resin (B). That is, the $T\alpha_{AP}$ satisfies a relationship of $T\alpha_B<T\alpha_{AP}<T\alpha_A$ or $T\alpha_A<T\alpha_{AP}<T\alpha_B$. The thermoplastic acrylic resin composition of the present invention having a $T\alpha_{AP}$ satisfying such a relationship is presumed to be in a state where the methacrylic resin (A) and the polyvinyl acetal resin (B) are partially or completely miscible with each other.

The thermoplastic acrylic resin composition of the present invention preferably satisfies a relationship of $T\alpha_{AP}=T\alpha_{BP}$ and, preferably, further satisfies a relationship of $T\alpha_B<T\alpha_{AP}=T\alpha_{BP}<T\alpha_A$ or $T\alpha_A<T\alpha_{AP}=T\alpha_{BP}<T\alpha_B$. The thermoplastic acrylic resin composition of the present invention having a $T\alpha_{AP}$ satisfying such a relationship is presumed to be in a state where the methacrylic resin (A) and the polyvinyl acetal resin (B) are completely miscible with each other.

The detailed reasons are not clear, but when the methacrylic resin (A) and the polyvinyl acetal resin (B) are presumed to be in a state where they are partially or completely miscible with each other, the thermoplastic acrylic resin composition of the present invention has heat resistance, surface hardness, and rigidity that are equivalent to those of the methacrylic resin and is hardly whitened when stretched, bent, or subjected to impact. In addition, the composition is excellent in toughness, impact resistance, and ease of handling.

When $T\alpha_{BP}=T\alpha_B$ and $T\alpha_{AP}=T\alpha_A$, the methacrylic resin (A) and the polyvinyl acetal resin (B) are presumed to be completely immiscible with each other. In such a case, there are tendencies that the strength is decreased, the toughness and the impact resistance are insufficient, and whitening occurs.

In the thermoplastic acrylic resin composition of the present invention, a continuous phase is preferably composed of the methacrylic resin (A). The thermoplastic acrylic resin composition of the present invention preferably has dispersed phases that can be observed with a transmission electron microscope when they are electron-stained with ruthenium tetroxide. Smaller dispersed phases are preferred. The average diameter of the dispersed phases is usually 200 nm or less, preferably 100 nm or less, and most preferably 50 nm or less. In the cases that the average diameter of the dispersed phases is 50 nm or less, a case that the two components are completely miscible with each other and thereby no dispersed particles are observed is included.

The stained dispersed phases are presumed to contain the polyvinyl acetal resin (B), and the non-stained continuous phase is presumed to be composed of the methacrylic resin (A).

In the observation of the phase structure of the thermoplastic acrylic resin composition, ultrathin sections are firstly prepared with an ultramicrotome (Reichert Ultracut-S, produced by RICA), then electron staining with ruthenium tetroxide is performed, and the sections are observed with a transmission electron microscope, H-800NA, produced by Hitachi, Ltd.

A preferred method of producing the thermoplastic acrylic resin composition of the present invention comprises the steps of mixing the methacrylic resin (A) and the polyvinyl acetal resin (B), preferably, mixing them under melting conditions, then increasing the resin temperature to 160° C. or more, thereafter decreasing the resin temperature to 120° C. or less.

Another preferred method comprises the steps of melt-kneading the methacrylic resin (A) and the polyvinyl acetal resin (B) at a resin temperature of 140° C. or more and then decreasing the resin temperature to 120° C. or less.

In a particularly preferred method, the step of melt-kneading the methacrylic resin (A) and the polyvinyl acetal resin (B) at a resin temperature of 160° C. or more comprises repeating at least twice each stage of applying a shearing force at a shear rate of 100 sec$^{-1}$ or more and of applying a shearing force at a shear rate of 50 sec$^{-1}$ or less.

The melt-kneading of the methacrylic resin (A) and the polyvinyl acetal resin (B) is preferably performed using a known kneading machine such as a single-screw extruder, a twin-screw extruder, a Banbury mixer, a Brabender, an open roll, or a kneader. Among these kneading machines, the twin-screw extruder allows the methacrylic resin (A) to form a continuous phase and is excellent in productivity and is therefore preferred.

The resin temperature during the melt-kneading is preferably 140° C. or more, more preferably 140 to 270° C., and most preferably 160 to 250° C.

The shearing force is preferably applied to the thermoplastic acrylic resin composition during the melt-kneading at a shear rate of 100 sec$^{-1}$ or more and more preferably 200 sec$^{-1}$ or more.

In the preferred method of the present invention, after the increase of the resin temperature to 160° C. or more or melt-kneading at a resin temperature of 140° C. or more, the resin temperature is decreased to 120° C. or less. The resin is preferably cooled rapidly, compared to natural cooling, by, for example, immersing the resin strand in a molten state in cold water in a tank. The rapid cooling allows the methacrylic resin (A) to form a continuous phase and the methacrylic resin (A) and the polyvinyl acetal resin (B) to be partially or completely miscible with each other, and also makes the size of the dispersed phases very small. The size of the dispersed phases is usually 200 nm or less, preferably 100 nm or less, and more preferably 50 nm or less.

The thermoplastic acrylic resin composition of the present invention may contain various additives such as an antioxidant, a stabilizer, a lubricant, a processing aid, an anti-static agent, a colorant, an anti-impact agent, a foaming agent, a filler, or a delustering agent, if need be. Note that the amounts of a softener and a plasticizer are preferably low, from the viewpoints of the mechanical properties and the surface hardness of the thermoplastic acrylic resin composition.

Furthermore, in order to improve weather resistance, the thermoplastic acrylic resin composition may contain an ultraviolet absorber. The type of the ultraviolet absorber is not particularly limited, but benzotriazole ultraviolet absorber, benzophenone ultraviolet absorber, or triazine ultraviolet absorber is preferable. The amount of the ultraviolet absorber added to the thermoplastic acrylic resin composition is usually from 0.1 to 10 mass %, preferably from 0.1 to 5 mass %, and more preferably from 0.1 to 2 mass of the resin composition.

The additives added to the thermoplastic acrylic resin composition of the present invention may be added to the methacrylic resin (A) and/or the polyvinyl acetal resin (B) as the raw materials or may be added during producing the thermoplastic acrylic resin composition or molding the thermoplastic acrylic resin composition.

The thermoplastic acrylic resin composition of the present invention is used, for example, as a molding material in a pellet or powder form. The molding material can be produced into various molded articles by a known molding method such as extrusion molding, injection molding, vacuum molding, compressed air molding, blow molding, transfer molding, rotational molding, or powder slush molding.

The thermoplastic acrylic resin composition according to a preferred embodiment of the present invention has a haze of 0.3% or less when a test piece having a thickness of 4 mm was subjected to measurement in accordance with JIS K 7136.

Melt extrusion and injection molding such as T-die, calendar, and inflation methods, which apply a high shearing force to the thermoplastic acrylic resin composition, are preferred for obtaining molded articles that are excellent in transparency, impact resistance, ease of handling, and balance between toughness and surface hardness or rigidity, have improved toughness, and are hardly whitened when stretched, bent, or subjected to impact. In particular, in order to obtain a film-like molded article, the T-die method is preferred from the viewpoint of economic efficiency.

Preferred resin temperature for melt-molding the thermoplastic acrylic resin composition is from 160° C. to 270° C. After molding, the molded article is preferably cooled rapidly compared to natural cooling. For example, a film-like molded article is preferably rapidly cooled immediately after extrusion by being brought into contact with a cooling roll. By thus rapidly cooling the molded article, the methacrylic resin (A) can form a continuous phase, and the methacrylic resin (A) and the polyvinyl acetal resin (B) can be partially or completely miscible with each other.

The thermoplastic acrylic resin composition of the present invention and a molded article formed therefrom can be used as members that will be applied to various purposes. Examples of the purposes include marking films or signboard parts such as advertising pillars, standing signboards, side signboards, transom signboards, and roof signboards; display parts such as showcases, partition panels, and store displays; illumination parts such as fluorescent covers, mood lighting covers, lamp shades, luminous ceilings, luminous walls, and chandeliers; interior parts such as furniture, pendants, and mirrors; architectural parts such as doors, domes, safety window glasses, partitions, stairway wainscot, balcony wainscot, and roofs of leisure buildings; transport machine-related parts such as airplane windshields, pilot's visors, motorcycles, motorboat windshields, bus sun visors, vehicle side visors, rear visors, head wings, headlight covers, automobile interior members, and automobile exterior members such as bumpers; electronic equipment parts such as nameplates for acoustic imaging, stereo covers, television protective masks, vending machines, mobile phones, and personal computers;

medical equipment parts such as incubators and X-ray parts; equipment-related parts such as machine covers, instrument covers, laboratory equipments, rulers, dial plates, and observation windows; optical-related parts such as liquid crystal protection plates, light guide plates, light guide films, Fresnel lenses, lenticular lenses, front plates for various displays, and diffusers; traffic-related parts such as traffic signs, guide plates, traffic mirrors, and soundproof walls; greenhouses, large water tanks, box water tanks, bathroom members, clock panels, bathtubs, sanitary fitments, desk mats, game parts, toys, and face protection masks during welding; and surface materials for use in personal computers, mobile phones, furniture, vending machines, and bathroom members.

The use of the thermoplastic acrylic resin composition of the present invention can give molded articles that are excellent in balance among toughness, impact resistance, surface hardness, and rigidity and in easy to handle and also have excellent design characteristics since they are not whitened when stretched, bent, and/or subjected to impact. When a film-like or sheet-like article molded from the thermoplastic acrylic resin composition of the present invention is formed on a base material made of a steel material, a plastic sheet, wood, glass, or the like by, for example, adhesion, lamination, insert molding, or in-mold process, the base material not only can be improved in design characteristics but also can be protected. The design characteristics and protective properties can be further enhanced by applying a coating layer cured by irradiation with ultraviolet light (UV) or electron beam (EB) on the thermoplastic acrylic resin composition of the present invention that was combined with the base material. Furthermore, co-extrusion of the thermoplastic acrylic resin composition of the present invention and a base material made of a steel material, plastic, wood, glass, or the like can enhance the design characteristics of the base material. Moreover, taking advantage of excellent design characteristics, the thermoplastic acrylic resin composition can be suitably used in wallpapers, surfaces of automobile interior members, surfaces of automobile exterior members such as bumpers, surfaces of mobile phones, surfaces of furniture, surfaces of personal computers, surfaces of vending machines, surfaces of bathroom members such as bathtubs, and so on.

EXAMPLES

The present invention will be more specifically described with reference to Examples below, but the present invention is not limited to these Examples. In these Examples, "part(s)" means "part(s) by mass" unless otherwise noted, and "%" means "mass %" unless otherwise noted.

The properties of molding materials including the thermoplastic acrylic resin composition were evaluated by the following methods.

(1) Weight-average Molecular Weight

Using tetrahydrofuran as a solvent, Shodex (trademark) KF-806L as a gel permeation chromatography column was connected with Shodex (trademark) GPC System 11, produced by Showa Denko K.K., and Shodex (trademark) differential refractive index detector RI-101 was used as a detector. A sample solution was prepared by dissolving precisely weighed 3 mg of a polymer in 3 ml of tetrahydrofuran and filtering the solution through a 0.45-μm membrane filter. The weight-average molecular weight (Mw) was calculated as a molecular weight in terms of poly(methylmethacrylate) based on a calibration curve generated with standard poly(methylmethacrylate) manufactured by Polymer Laboratories at a measurement temperature of 40° C. and a flow rate of 1.0 mL/min.

(2) Morphological Observation by Transmission Electron Microscope

The thermoplastic acrylic resin composition was melt-kneaded and then cooled. An ultrathin section was prepared using an ultramicrotome (Reichert Ultracut-S, produced by RICA). The section was electronically stained with ruthenium tetroxide to produce a sample. The area of the polyvinyl acetal resin (B) in the thermoplastic acrylic resin composition was stained. The morphology of the thus-prepared sample was observed under a transmission electron microscope H-800NA produced by Hitachi, Ltd. The observed morphology was evaluated as follows:

a sample in that the non-stained area (the methacrylic resin (A)) formed a continuous phase: ○, and a sample in that the methacrylic resin (A) was discontinuous: ×.

Furthermore, the average dispersed particle diameter of the stained polyvinyl acetal resin (B) area was measured.

(3) Elastic Modulus, Elongation at Yield Point, Breaking Elongation, Toughness, and Observation of Whitened State in Tensile Test JIS K 6251 No. 2 dumbbell-shaped test pieces were prepared by punching a molded thin film having a thickness of 120 to 200 μm with a super dumbbell cutter manufactured by Dumb Bell Co., Ltd. The tension elastic modulus, elongation at yield point, and breaking elongation were measured by pulling the test pieces at a tension rate of 5 mm/min using Autograph AG-5000B, produced by Shimadzu Corporation.

The toughness was evaluated by the energy required until the specimen was fractured. The toughness in the present invention is defined as a physical property under a relatively slow deforming rate as represented by this Example.

Whitened states were evaluated by visually observing the broken test pieces. The length of the whitened area in the length direction of the test piece was evaluated as follows:

not less than 10 mm: ×, not less than 1 mm and less than 10 mm: Δ, less than 1 mm: ○, and no whitened area: ○○.

(4) Tear Strength and Observation of Whitened State in Tear Test

Notched angle-shaped test pieces were prepared according to JIS K 6252 by punching a molded thin film having a thickness of 120 to 200 μm with a super dumbbell cutter manufactured by Dumb Bell Co., Ltd. The tear strength (unit: N/mm) was determined by pulling the test pieces at a tension rate of 5 mm/min using Autograph AG-5000B, produced by Shimadzu Corporation, and converting the maximum tear strength of when the test piece was torn into tear strength per thickness of the test piece.

Whitened states were evaluated by visually observing the torn test pieces. The length of the whitened area in the length direction of the test piece was evaluated as follows:

not less than 10 mm: ×, not less than 1 mm and less than 10 mm: Δ, less than 1 mm: ○, and no whitened area: ○○.

(5) Impact Resistance

Films having a length of 25 mm, a width of 25 mm, and a thickness of 200 μm were prepared. A falling ball impact test was conducted using weights of 0.3 to 1.0 kg by Dupont impact tester (No. C-351601602) manufactured by Toyo Seiki Seisaku-sho, Ltd. The maximum impact (unit: J) when the film was not broken was determined. The impact (unit: J) applied to the film can be calculated from the weight (unit: kg) of the weight used in the test and the falling distance (unit: m) by the following calculation expression:

Impact applied to film [J]=weight of the weight [kg]× gravity acceleration [m/s$^2$]×falling distance [m].

(6) Surface Hardness

The pencil hardness of a molded thin film having a thickness of 200 μm was measured in accordance with JIS K 5600-5-4 using a pencil hardness tester (No. C-282700200) manufactured by Toyo Seiki Seisaku-sho, Ltd.

(7) Primary Dispersion Peak Temperature (Tα)

The primary dispersion peak temperature (Tα) of a loss tangent (tan δ) of a test piece having a length of 20 mm, a width of 3 mm, and a thickness of 200 μm was determined using DVE Rheospectoler DVE-V4, produced by Rheology Co., Ltd., under conditions of an inter-chuck distance of 10 mm, a sine wave vibration of 10 Hz, and a rate of temperature increase of 3° C./min.

(8) Haze

Haze of a test piece having a length of 10 mm, a width of 10 mm, and thickness of 4 mm was determined in accordance with JIS K 7136 using a haze meter NDH5000, produced by Nippon Denshoku Industries Co., Ltd.

(9) Visible Light Transmittance

The transmittance of a film having a thickness of 200 μm was measured in a wavelength range of 380 nm to 780 nm using UV-VIS-NIR spectrophotmeter Solidspec-3700, produced by Shimadzu Corporation, and visible light transmittance was calculated according to JIS R 3106.

Production Example 1

Methacrylic Resin

Methacrylic resins composed of a methyl methacrylate unit and a methyl acrylate unit at proportions shown in Table 1 were prepared by bulk polymerization. The weight-average molecular weights (Mw) and the primary dispersion peak temperatures $T\alpha_A$ of the methacrylic resins are shown in Table 1.

TABLE 1

|   | Methyl methacrylate (mass %) | Methyl acrylate (mass %) | Weight-average molecular weight (Mw) | Primary dispersion peak temperature $T\alpha_A$ (° C.) |
| --- | --- | --- | --- | --- |
| A-1 | 91.0 | 9.0 | 100000 | 128 |
| A-2 | 94.0 | 6.0 | 140000 | 128 |
| A-3 | 96.5 | 3.5 | 90000 | 135 |
| A-4 | 99.3 | 0.7 | 120000 | 140 |

Production Example 2

Polyvinyl Acetal Resin

To an aqueous solution of a polyvinyl alcohol resin, predetermined amounts of butyl aldehyde and/or acetaldehyde and hydrochloric acid were added, followed by stirring for acetalization to precipitate the resin. The precipitated resin was washed with water by a known method to obtain a pH of 6. Then, the precipitated resin was added to an alkaline aqueous solvent, followed by stirring to obtain a suspension. After washing with water again to obtain a pH of 7, drying was conducted to reduce the volatile content to 1.0% to obtain a polyvinyl acetal resin having a repeating unit proportion shown in Table 2.

The proportion of the polyvinyl acetal resin was determined based on $^{13}$C-NMR by calculating the mol % ($k_{(BA)}$) of the vinyl alcohol unit acetalized with an aldehyde having 4 or more carbon atoms to all repeating units, the mol % ($k_{(AA)}$) of the vinyl alcohol unit acetalized with an aldehyde having 3 or less carbon atoms to all repeating units, the mol % ($k_{(VA)}$) of the vinyl alcohol unit not acetalized to all repeating units, and the mol % ($k_{(AV)}$) of the vinyl acetate unit to all repeating units.

TABLE 2

| | Physical property of polyvinyl alcohol resin | | Aldehyde used for acetalization | | Physical properties of polyvinyl acetal resin | | | | | |
| --- | --- | --- | --- | --- | --- | --- | --- | --- | --- | --- |
| | Viscosity average degree of polymerization | Degree of saponification (mol %) | having 4 or more carbon atoms | having 3 or less carbon atoms | $k_{(BA)}$ (mol %) | $k_{(AA)}$ (mol %) | $k_{(BA)}/k_{(AA)}$ | $k_{(VA)}$ (mol %) | $k_{(VA)}$ (mol %) | Primary dispersion peak temperature $T\alpha_B$ (° C.) |
| B-1 | 1000 | 99 | butyl aldehyde | acetaldehyde | 47.1 | 19.2 | 71.0/29.0 | 32.4 | 1.2 | 94 |
| B-2 | 1700 | 99 | butyl aldehyde | acetaldehyde | 25.0 | 52.6 | 32.2/67.8 | 21.7 | 0.7 | 106 |
| B-3 | 2400 | 99 | butyl aldehyde | acetaldehyde | 27.5 | 47.8 | 36.5/63.5 | 23.4 | 1.3 | 106 |
| B-4 | 2400 | 99 | butyl aldehyde | acetaldehyde | 28.9 | 44.8 | 39.2/60.8 | 25.2 | 1.1 | 104 |
| B-5 | 2400 | 99 | — | acetaldehyde | — | 81.2 | 0/100 | 18.1 | 0.7 | 124 |
| B-6 | 1000 | 99 | butyl aldehde | — | 64.5 | — | 100/0 | 34.1 | 1.4 | 86 |
| B-7 | 1000 | 99 | butyl aldehyde | acetaldehyde | 55.6 | 5.8 | 90.6/9.4 | 37.3 | 1.3 | 90 |
| B-8 | 1700 | 99 | butyl aldehyde | acetaldehyde | 66.5 | 3.5 | 95.0/5.0 | 28.7 | 1.3 | 90 |
| B-9 | 1700 | 99 | butyl aldehyde | acetaldehyde | 24.0 | 36.0 | 40.0/60.0 | 38.7 | 1.3 | 108 |

Example 1

A thermoplastic acrylic resin composition was prepared by kneading 75 parts of a methacrylic resin (A-1) and 25 parts of a polyvinyl acetal resin (B-1) using a twin-screw extruder Labo Plastomill 2D30W2, produced by Toyo Seiki Seisaku-sho, Ltd., at a cylinder temperature of 230° C. and a screw rotation speed of 100 rpm. The resin temperature immediately before the end of the kneading was 260° C. The morphology of the obtained thermoplastic acrylic resin composition was observed. The results are shown in Table 3.

The pellet of the obtained thermoplastic acrylic resin composition was further extruded into thin-film samples using Labo Plastomill D2025, produced by Toyo Seiki Seisaku-sho, Ltd. The results of the properties are shown in Table 3.

Examples 2 to 5

Thermoplastic acrylic resin compositions were prepared by the same manner as in Example 1 except that any of polyvinyl acetal resins (B-2) to (B-5) was used instead of the polyvinyl acetal resin (B-1). Property evaluation and morphology observation of the obtained thermoplastic acrylic resin compositions were performed by the same manner as in Example 1. The results thereof are shown in Table 3.

Examples 6 to 7

Thermoplastic acrylic resin compositions were prepared by the same manner as in Example 1 except that polyvinyl acetal resin (B-2) was used instead of the polyvinyl acetal resin (B-1) and that methacrylic resin (A-2) or (A-3) was used instead of the methacrylic resin (A-1). Property evaluation and morphology observation of the obtained thermoplastic acrylic resin compositions were performed by the same manner as in Example 1. The results thereof are shown in Table 3.

Examples 8 to 12

Thermoplastic acrylic resin compositions were prepared by the same manner as in Example 1 except that methacrylic resin (A-4) and polyvinyl acetal resin (B-2) were used at ratios shown in Table 4 instead of the methacrylic resin (A-1) and the polyvinyl acetal resin (B-1). Property evaluation and morphology observation of the obtained thermoplastic acrylic resin compositions were performed by the same manner as in Example 1. The results thereof are shown in Table 4.

TABLE 3

| | Example | | | | | | |
|---|---|---|---|---|---|---|---|
| | 1 | 2 | 3 | 4 | 5 | 6 | 7 |
| Methacrylic resin | | | | | | | |
| A-1 | 75 | 75 | 75 | 75 | 75 | — | — |
| A-2 | — | — | — | — | — | 75 | — |
| A-3 | — | — | — | — | — | — | 75 |
| Polyvinyl acetal resin | | | | | | | |
| B-1 | 25 | — | — | — | — | — | — |
| B-2 | — | 25 | — | — | — | 25 | 25 |
| B-3 | — | — | 25 | — | — | — | — |
| B-4 | — | — | — | 25 | — | — | — |
| B-5 | — | — | — | — | 25 | — | — |
| Morphology | | | | | | | |
| Non-stained area condition | ○ | ○ | ○ | ○ | ○ | ○ | ○ |
| Average diameter (nm) of stained area | 300 | 40 | 30 | 50 | 25 | 30 | 25 |
| Tension test | | | | | | | |
| Elastic modulus (MPa) | 3600 | 3700 | 3700 | 3700 | 3700 | 3600 | 3600 |
| Elongation at yield (%) | 2.6 | 2.9 | 2.9 | 2.8 | 3.2 | 3.1 | 3.1 |
| Breaking elongation (%) | 6.4 | 7.0 | 7.6 | 11 | 14 | 13 | 10 |
| Toughness (kJ/m$^3$) | 3000 | 3400 | 3900 | 5400 | 6500 | 7300 | 5000 |
| Whitening state | ⊙ | ⊙ | ⊙ | ⊙ | ⊙ | ⊙ | ⊙ |
| Tear test | | | | | | | |
| Tear strength (N/mm) | 69 | 83 | 89 | 98 | 98 | 86 | 81 |
| Whitening state | ⊙ | ⊙ | ⊙ | ⊙ | ⊙ | ⊙ | ⊙ |
| Falling ball impact test (J) | 1.03 | 1.72 | 1.72 | 1.72 | 2.94 | 2.45 | 2.45 |
| Surface hardness | H | 2H | 2H | 2H | 2H | 2H | 2H |
| Primary dispersion peak temperature (° C.) | | | | | | | |
| T$\alpha_A$ | 128 | 128 | 128 | 128 | 128 | 128 | 135 |
| T$\alpha_{AP}$ | 126 | 120 | 120 | 124 | 126 | 120 | 124 |
| T$\alpha_{BP}$ | 88 | 120 | 120 | 124 | 126 | 120 | 124 |
| T$\alpha_B$ | 94 | 106 | 106 | 104 | 124 | 106 | 106 |
| Haze (%) | 0.6 | 0.3 | 0.2 | 0.3 | 0.3 | 0.3 | 0.3 |
| Visible light transmittance (%) | 92.4 | 92.5 | 92.5 | 92.5 | 92.5 | 92.4 | 92.5 |

TABLE 4

| | Example | | | | |
|---|---|---|---|---|---|
| | 8 | 9 | 10 | 11 | 12 |
| Methacrylic resin | | | | | |
| A-4 | 75 | 80 | 70 | 60 | 50 |
| Polyvinyl acetal resin | | | | | |
| B-2 | 25 | 20 | 30 | 40 | 50 |
| Morphology | | | | | |
| Non-stained area condition | ○ | ○ | ○ | ○ | ○ |
| Average diameter (nm) of stained area | 25 | 25 | 25 | 25 | 25 |
| Tension test | | | | | |
| Elastic modulus (MPa) | 3500 | 3400 | 3400 | 3100 | 2800 |
| Elongation at yield (%) | 3.2 | 3.8 | 3.3 | 3.2 | 3.0 |
| Breaking Elongation (%) | 12 | 11 | 18 | 27 | 45 |
| Toughness (kJ/m$^3$) | 6200 | 6000 | 9300 | 19800 | 27500 |
| Whitening state | ⊙ | ⊙ | ⊙ | ⊙ | ⊙ |
| Tear test | | | | | |
| Tear strength (N/mm) | 86 | 50 | 71 | 71 | 71 |

TABLE 4-continued

|  | Example | | | | |
|---|---|---|---|---|---|
|  | 8 | 9 | 10 | 11 | 12 |
| Whitening state | ○○ | ○○ | ○○ | ○○ | ○○ |
| Falling ball impact test (J) | 2.94 | 2.45 | 3.92 | 4.41 | 4.41 |
| Surface hardness | 2H | 2H | 2H | H | H |
| Primary dispersion peak temperature (° C.) | | | | | |
| $T\alpha_A$ | 140 | 140 | 140 | 140 | 140 |
| $T\alpha_{AP}$ | 124 | 128 | 122 | 118 | 114 |
| $T\alpha_{BP}$ | 124 | 128 | 122 | 118 | 114 |
| $T\alpha_B$ | 106 | 106 | 106 | 106 | 106 |
| Haze (%) | 0.3 | 0.2 | 1.2 | 4.5 | 9.9 |
| Visible light transmittance (%) | 92.5 | 92.5 | 91.7 | 83.4 | 73.3 |

Comparative Examples 1 to 4

Thermoplastic acrylic resin compositions were prepared by the same manner as in Example 1 except that any of polyvinyl acetal resins (B-6) to (B-9) was used instead of the polyvinyl acetal resin (B-1). Property evaluation and morphology observation of the obtained thermoplastic acrylic resin compositions were performed by the same manner as in Example 1. The results thereof are shown in Table 5.

Comparative Examples 5 to 8

Test pieces were prepared by the same manner as in Example 1 except that a resin material consisting of any of methacrylic resins (A-1) to (A-4) only was used instead of the thermoplastic acrylic resin composition obtained in Example 1. Property evaluation and morphology observation of the obtained test pieces were performed by the same manner as in Example 1. The results thereof are shown in Table 5.

TABLE 5

|  | Comparative Example | | | | | | | |
|---|---|---|---|---|---|---|---|---|
|  | 1 | 2 | 3 | 4 | 5 | 6 | 7 | 8 |
| Methacrylic resin | | | | | | | | |
| A-1 | 75 | 75 | 75 | 75 | 100 | — | — | — |
| A-2 | — | — | — | — | — | 100 | — | — |
| A-3 | — | — | — | — | — | — | 100 | — |
| A-4 | — | — | — | — | — | — | — | 100 |
| Polyvinyl acetal resin | | | | | | | | |
| B-6 | 25 | — | — | — | — | — | — | — |
| B-7 | — | 25 | — | — | — | — | — | — |
| B-8 | — | — | 25 | — | — | — | — | — |
| B-9 | — | — | — | 25 | — | — | — | — |
| Morphology | | | | | | | | |
| Non-stained area condition | ○ | ○ | ○ | ○ | — | — | — | — |
| Average diameter (nm) of stained area | 600 | 500 | 500 | 400 | — | — | — | — |
| Tension test | | | | | | | | |
| Elastic modulus (MPa) | 3400 | 3400 | 3400 | 3400 | 3600 | 3700 | 3600 | 3600 |
| Elongation at yield (%) | — | — | 3.0 | 3.0 | — | — | — | — |
| Breaking elongation (%) | 2.1 | 2.2 | 5.0 | 4.5 | 2.4 | 3.9 | 3.0 | 2.8 |
| Toughness (kJ/m³) | 800 | 800 | 2200 | 2200 | 900 | 1900 | 1300 | 1200 |
| Whitening state | ○○ | ○○ | ○○ | ○○ | ○○ | ○○ | ○○ | ○○ |
| Tear test | | | | | | | | |
| Tear strength (N/mm) | 47 | 47 | 48 | 49 | 40 | 30 | 30 | 30 |
| Whitening state | ○○ | ○○ | ○○ | ○○ | ○○ | ○○ | ○○ | ○○ |
| Falling ball impact test (J) | 0.74 | 0.88 | 0.88 | 0.88 | 0.00 | 0.00 | 0.00 | 0.00 |
| Surface hardness | H | H | H | H | 3H | 3H | 3H | 3H |
| Primary dispersion peak temperature (° C.) | | | | | | | | |
| $T\alpha_A$ | 128 | 128 | 128 | 128 | 128 | 128 | 134 | 140 |
| $T\alpha_{AP}$ | 124 | 124 | 124 | 124 | — | — | — | — |
| $T\alpha_{BP}$ | 80 | 82 | 78 | 98 | — | — | — | — |
| $T\alpha_B$ | 86 | 90 | 90 | 108 | — | — | — | — |
| Haze (%) | 1.2 | 0.8 | 0.8 | 0.6 | 0.2 | 0.2 | 0.2 | 0.2 |
| Visible light transmittance (%) | 92.4 | 92.4 | 92.4 | 92.4 | 92.5 | 92.5 | 92.5 | 92.5 |

The results above show that the thermoplastic acrylic resin compositions obtained by blending a methacrylic resin (A) with a polyvinyl acetal resin (B), where the total amount of vinyl alcohol units acetalized with an aldehyde having 4 or more carbon atoms and an aldehyde having 3 or less carbon atoms is 65 to 85 mol % of all repeating units and the molar ratio of the vinyl alcohol unit acetalized with the aldehyde having 4 or more carbon atoms to the vinyl alcohol unit acetalized with the aldehyde having 3 or less carbon atoms is from 90/10 to 0/100, have highly improved toughness and impact resistance while maintaining characteristics such as transparency, high surface hardness, high rigidity, weather resistance, and heat resistance.

The invention claimed is:

1. A thermoplastic acrylic resin composition, comprising:
   a methacrylic resin (A) comprising 80 to 99.9% by mass of alkyl methacrylate units and 0.1 to 20% by mass of alkyl acrylate units and having a weight-average molecular weight (Mw) of 40,000 or more; and
   a polyvinyl acetal resin (B)
   comprising repeating units represented by formula (1) below:

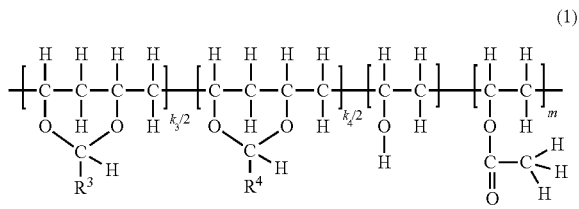

(1)

wherein $R^3$ is an alkyl group having 2 or less carbon atoms or a hydrogen atom, $R^4$ is an alkyl group having 3 or more carbon atoms, l is a mole fraction of vinyl alcohol units and m is a mole fraction of vinyl acetate units, $k_3$ is a mole fraction of vinyl alcohol units acetalized by an aldehyde having 3 or less carbon atoms, and $k_4$ is a mole fraction of vinyl alcohol units acetalized by an aldehyde having 4 or more carbon atoms, and a ratio of $(k_3+k_4)/(k_3+k_4+l+m)$ is from 0.65 to 0.85, and a ratio of $k_4/k_3$ is from 90/10 to 1/99.

2. The thermoplastic acrylic resin composition according to claim 1, wherein the ratio of $(k_3+k_4)/(k_3+k_4+l+m)$ is from 0.7 to 0.85, and the ratio of $k_4/k_3$ is from 40/60 to 1/99.

3. The thermoplastic acrylic resin composition according to claim 1, wherein the methacrylic resin (A) is comprised in a continuous phase.

4. The thermoplastic acrylic resin composition according to claim 1, wherein a primary dispersion peak temperature ($T\alpha_A$) of the methacrylic resin (A) and a primary dispersion peak temperature ($T\alpha_B$) of the polyvinyl acetal resin (B) satisfy a relationship: $90°C.\leq T\alpha_B \leq T\alpha_A$ or $90°C.\leq T\alpha_A \leq T\alpha_B$.

5. The thermoplastic acrylic resin composition according to claim 1, wherein a primary dispersion peak temperature ($T\alpha_{AP}$) derived from the methacrylic resin (A) in the thermoplastic acrylic resin composition, a primary dispersion peak temperature ($T\alpha_A$) of the methacrylic resin (A), and a primary dispersion peak temperature ($T\alpha_B$) of the polyvinyl acetal resin (B) satisfy a relationship: $T\alpha_{AP} < T\alpha_A$ or $T\alpha_{AP} < T\alpha_B$.

6. The thermoplastic acrylic resin composition according to claim 1, wherein a primary dispersion peak temperature (TαAP) derived from the methacrylic resin (A) in the thermoplastic acrylic resin composition and a primary dispersion peak temperature ($T\alpha_{BP}$) derived from the polyvinyl acetal resin (B) in the thermoplastic acrylic resin composition satisfy a relationship: $T\alpha_{AP}=T\alpha_{BP}$.

7. The thermoplastic acrylic resin composition according to claim 1, wherein a primary dispersion peak temperature ($T\alpha_{AP}$) derived from the methacrylic resin (A) in the thermoplastic acrylic resin composition, a primary dispersion peak temperature ($T\alpha_{BP}$) derived from the polyvinyl acetal resin (B) in the thermoplastic acrylic resin composition, a primary dispersion peak temperature ($T\alpha_A$) of the methacrylic resin (A), and a primary dispersion peak temperature ($T\alpha_B$) of the polyvinyl acetal resin (B) satisfy a relationship: $T\alpha_B < T\alpha_{AP}=T\alpha_{BP} < T\alpha_A$ or $T\alpha_A < T\alpha_{AP}=T\alpha_{BP} < T\alpha_B$.

8. The thermoplastic acrylic resin composition according to claim 1, wherein a mass ratio of the methacrylic resin (A) to the polyvinyl acetal resin (B), (A)/(B), is from 99/1 to 51/49.

9. The thermoplastic acrylic resin composition according to claim 1, wherein the polyvinyl acetal resin (B) is obtained by acetalizing a polyvinyl alcohol resin having a viscosity-average degree of polymerization of 200 to 4000.

10. The thermoplastic acrylic resin composition according to claim 1, which has dispersed phases having an average diameter of 50 nm or less that can he observed with a transmission electron microscope when the dispersed phases are electron-stained with ruthenium tetroxide.

11. The thermoplastic acrylic resin composition according to claim 1, wherein a test piece of the thermoplastic acrylic resin composition having a thickness of 4 mm is 0.3% or less in a haze as measured in accordance with JIS K 7136.

12. An article molded from the thermoplastic acrylic resin composition according to claim 1.

13. The molded article according to claim 12, in the form of a film.

14. A laminated article comprising the molded article according to claim 12 and a substrate.

15. A method of producing the thermoplastic acrylic resin composition according to claim 1, the method comprising:
mixing the methacrylic resin (A) and the polyvinyl acetal resin (B);
increasing resin temperature to 160° C. or more; and then decreasing the resin temperature to 120° C. or less.

16. A method of producing the thermoplastic acrylic resin composition according to claim 1, the method comprising:
melt-kneading the methacrylic resin (A) and the polyvinyl acetal resin (B) at a resin temperature of 140° C. or more; and then
decreasing the resin temperature to 120° C. or less.

* * * * *